United States Patent
Ho et al.

(10) Patent No.: US 8,995,421 B2
(45) Date of Patent: Mar. 31, 2015

(54) PROCESSING POLLING REQUESTS FROM RADIO LINK CONTROL PEERS

(75) Inventors: Sai Yiu Duncan Ho, San Diego, CA (US); Gang A. Xiao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 268 days.

(21) Appl. No.: 12/536,721

(22) Filed: Aug. 6, 2009

(65) Prior Publication Data

US 2010/0034095 A1 Feb. 11, 2010

Related U.S. Application Data

(60) Provisional application No. 61/087,606, filed on Aug. 8, 2008.

(51) Int. Cl.
*H04J 3/16* (2006.01)
*H04L 12/42* (2006.01)
*H04L 1/16* (2006.01)
*H04L 1/18* (2006.01)

(52) U.S. Cl.
CPC ............ *H04L 1/1685* (2013.01); *H04L 1/1642* (2013.01); *H04L 1/1841* (2013.01); *H04L 1/1848* (2013.01); *H04L 1/1854* (2013.01)
USPC ............................................ 370/346; 370/449

(58) Field of Classification Search
None
See application file for complete search history.

(56) References Cited

U.S. PATENT DOCUMENTS

| | | | | |
|---|---|---|---|---|
| 5,783,992 A | * | 7/1998 | Eberwine et al. | 340/445 |
| 2002/0172199 A1 | * | 11/2002 | Scott et al. | 370/389 |
| 2006/0013257 A1 | * | 1/2006 | Vayanos | 370/473 |
| 2006/0251105 A1 | * | 11/2006 | Kim et al. | 370/449 |
| 2008/0279171 A1 | * | 11/2008 | Kim et al. | 370/346 |

FOREIGN PATENT DOCUMENTS

| | | |
|---|---|---|
| CN | 1473406 A | 2/2004 |
| CN | 101116277 A | 1/2008 |
| CN | 101162977 A | 4/2008 |
| JP | 2007053747 A | 3/2007 |
| RU | 2005134955 A | 4/2006 |
| WO | 2004091155 A1 | 10/2004 |
| WO | 2006083149 A1 | 8/2006 |

OTHER PUBLICATIONS

CATT: "Status Report Trigger and Polling," 3GPP Draft; R2-080123, 3rd Generation Partnership Project, Mobile Competence Centre, Jan. 8, 2008.
International Search Report—PCT/US2009/053204—International Search Authority—European Patent Office, Apr. 7, 2010.

(Continued)

*Primary Examiner* — Jutai Kao
(74) *Attorney, Agent, or Firm* — Paul Kuo

(57) ABSTRACT

This innovation relates to systems and methods for transmission of protocol data units, and more particularly to processing polling requests from a radio link control peer. A radio link control transmitter can poll a receiver to obtain a report regarding the status of a set of data packets, and the polls can be sent in-band with a data packet. The receiver can determine to wait before sending the status report based on one or more characteristics of the received data packets.

30 Claims, 10 Drawing Sheets

(56) References Cited

OTHER PUBLICATIONS

Qualcomm Europe. "LTE RIiC Polling and Status Report Timing" 1 3GPP Draft; R2-074374, 3rd Generation >, Partnership Project (SGPPJ), Mobile Competence Centre ; 650, Route Des Lucioles ; F-06921 Sophia-Antipolis Cedex ; France, vol. tsg_ranWG2_RL2TSGR2_59bis Docs, no. Shanghai, China; Oct. 8, 2007, Oct. 1, 2007 the whole document.

ZTE: "RLC AM Reordering and Status Prohibit," 3GPP Draft; R2-081629, 3rd Generation Partnership Project (3GPP), Mobile Competence Centre, vol. RAN WG2, Mar. 25, 2008.

ZTE: "RLC-AM Status Prohibit," 3GPP Draft; R2-080032, 3rd Generation Partnership Project, Mobile Competence Centre, Jan. 8, 2008.

Written Opinion—PCT/US2009/053204, International Search Authority, European Patent Office, Apr. 7, 2010.

ASUSTeK "HARQ reordering for RLC retransmitted PDUs", 3GPP TSG-RAN WG2 #61 R2-080693, Feb. 2008, URL, http://www.3gpp.org/ftp/tsg_ran/WG2_RL2/TSGR2_61/Docs/R2-080693.zip.

Taiwan Search Report—TW098126769—TIPO—Dec. 3, 2012.

NTT DOCOMO, Inc: "E-mail discussion on RLC AM receive operations", 3GPP TSG-RAN WG2#61 R2-081180, Interntet <URL:http//www.3gpp.org/ftp/tsg_ran/WG2_RL2/TSGR2_61/Docs/R2-081180.zip>, Feb. 2008.

Samsung, "RLC Timers", 3GPP TSG-RAN WG2#61bis R2-081532, Internet <URL:http//www.3gpp.org/ftp/tsg_ran/WG2_RL2/TSGR2_61bis/Docs/R2-081532.zip>, Mar. 2008.

\* cited by examiner

PROCESSING POLLING REQUESTS FROM RADIO LINK CONTROL PEERS

CLAIM OF PRIORITY UNDER 35 U.S.C. §119

The present Application for patent claims priority to Provisional Application No. 61/087,606 entitled "PROCESSING A POLLING REQUEST FROM AN RLC PEER" filed Aug. 8, 2008, and assigned to the assignee hereof and hereby expressly incorporated by reference herein.

BACKGROUND

1. Field

The present aspects relate to wireless communication, and more particularly, to techniques for processing a polling request from a radio link control peer.

2. Background

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple (NT) transmit antennas and multiple (NR) receive antennas for data transmission. A MIMO channel formed by the NT transmit and NR receive antennas may be decomposed into a set of spatial channels (NS) independent channels, where each of the NS independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beam forming gain on the forward link when multiple antennas are available at the access point.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with processing polling requests from radio link control peers. According to related aspects, a method for processing polling requests from radio link control peers is provided. The method includes receiving a set of data packets, determining at least one characteristic of the data packets, and comparing the characteristics with a reference value to determine whether to generate a status report.

Another aspect relates to a wireless communication apparatus having at least one processor configured to process polling requests from radio link control peers. The wireless communication apparatus includes a first module for receiving at least one protocol data unit, a second module for determining a sequence number associated with the protocol data unit, a third module for detecting an included polling request in the protocol data unit, a fourth module for comparing the sequence number of the protocol data unit having the included polling request to a value of a maximum status transmit state variable, and a fifth module for generating a status report if the sequence number of the protocol data having the included polling request is at least one of equal to or less than the value of the maximum status transmit state variable.

Yet another aspect relates to a computer program product. The computer program product includes a computer readable medium including a first set of codes for causing a computer to obtain one or more protocol data units, a second set of codes for causing the computer to locate a sequence number for each of the protocol data units, a third set of codes for causing the computer to detect a value of a polling bit in the protocol data units, a fourth set of codes for causing the computer to compare the sequence number of the protocol data unit to a value of a maximum status transmit state variable, wherein the value of the polling bit in the protocol data unit is one, and a fifth set of codes for causing the computer to generate a status report if the sequence number of the protocol is at least one of equal to or less than the value of the maximum status transmit state variable, wherein the value of the polling bit in the protocol data unit is one.

Still another aspect relates to an apparatus. The apparatus including means for acquiring one or more data packets, means for processing the data packets, wherein processing includes at least one of determining a sequence number for each data packet, or identifying if a poll is included in each packet, means for determining a value for a maximum status transmit state variable, wherein the maximum status transmit state variable stores the highest sequence number of the set of received data packets that can be carried in the acknowledgement/negative acknowledgement field of a status report, and means for evaluating the sequence number of the data packet that includes the poll in relation to the value of the maximum status transmit state variable.

Moreover an additional aspect relates to an apparatus. The apparatus includes a data reception component that obtains one or more packets, a packet inspection component that determines a sequence number, and the existence of a polling request for each received packet, and a status report component that generates a status report based at least in part on a comparison of the sequence number of the packet to a reference value, wherein a polling request exist in the packet.

Yet another aspect relates to a wireless communication apparatus. The wireless communication apparatus includes a memory that stores at least one received data packet, and a processor configured to determine at least one characteristic of the data packets, and compare the characteristics with a reference value to determine whether to generate a status report.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
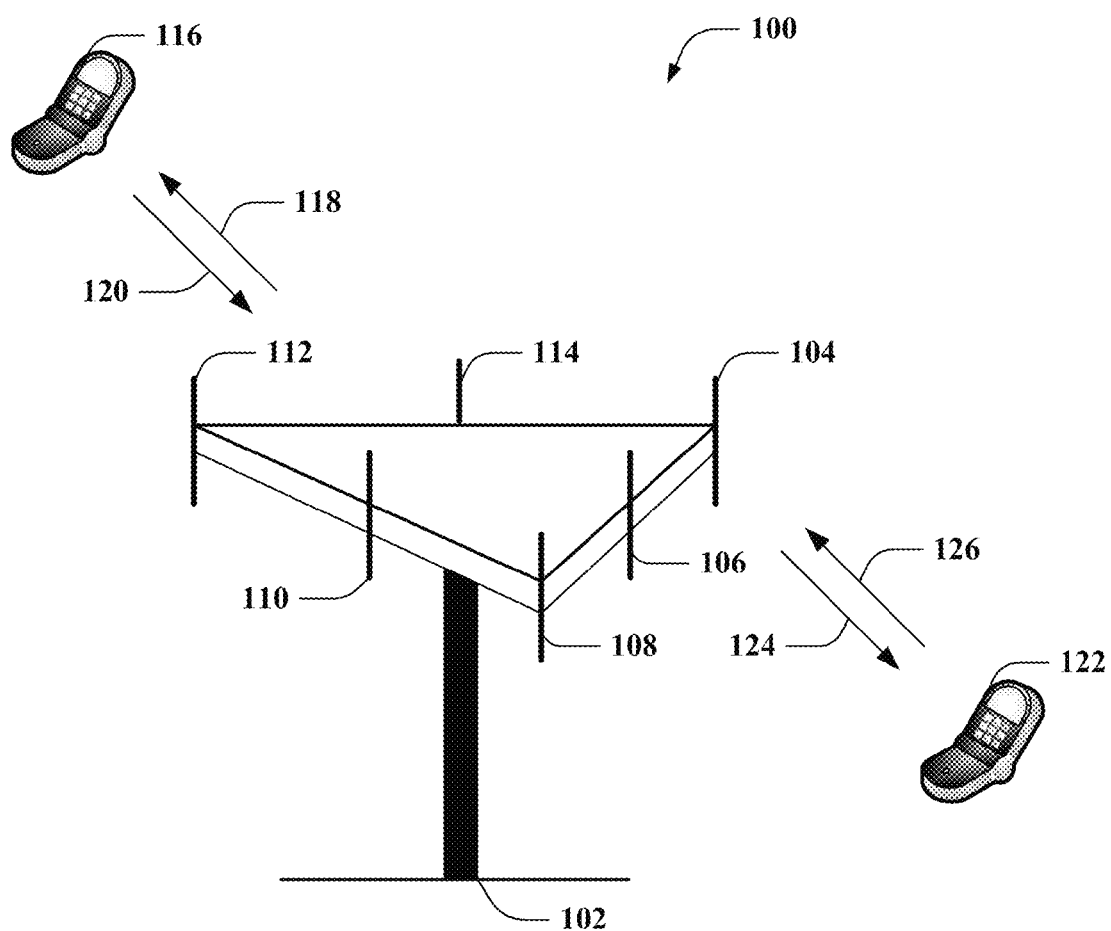
FIG. 1 illustrates an exemplary multiple access wireless communication system.

Various aspects are now described with reference to the drawings. In the following description, for purposes of explanation, numerous specific details are set forth in order to provide a thorough understanding of one or more aspects. It may be evident; however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beam-forming to improve signal-to-noise ratio of forward links 118 and 124 for mobile devices 116 and 122. This can be provided by using a precoder to steer signals in desired directions, for example. Also, while base station 102 utilizes beam-forming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology in one example.

According to an example, system 100 can be a multiple-input multiple-output (MIMO) communication system. Further, system 100 can utilize substantially any type of duplexing technique to divide communication channels (e.g., forward link, reverse link, etc.) such as FDD, TDD, and the like. Moreover, the system 100 can be a multiple-bearer system. A bearer can be an information path of defined capacity, delay, bit error rate, etc. Mobile devices 116 and 122 can each serve one or more radio bearers. The mobile devices 116 and 122 can employ uplink rate control mechanisms to manage and/or share uplink resources across the one or more radio bearers. In one example, the mobile devices 116 and 122 can utilize token bucket mechanisms to serve the radio bearers and to enforce uplink rate limitations.

Pursuant to an illustration, each bearer can have an associated prioritized bit rate (PBR), maximum bit rate (MBR) and guaranteed bit rate (GBR). The mobile devices 116 and 122 can serve the radio bearers based, at least in part, on the associated bit rate values. The bit rate values can also be employed to calculate queue sizes that account for PBR and MBR for each bearer. The queue sizes can be included in uplink resource requests transmitted by the mobile devices 116 and 122 to the base station 102. The base station 102 can schedule uplink resources for mobile device 116 and 122 based upon respective uplink requests and included queue sizes.

Figure 2:
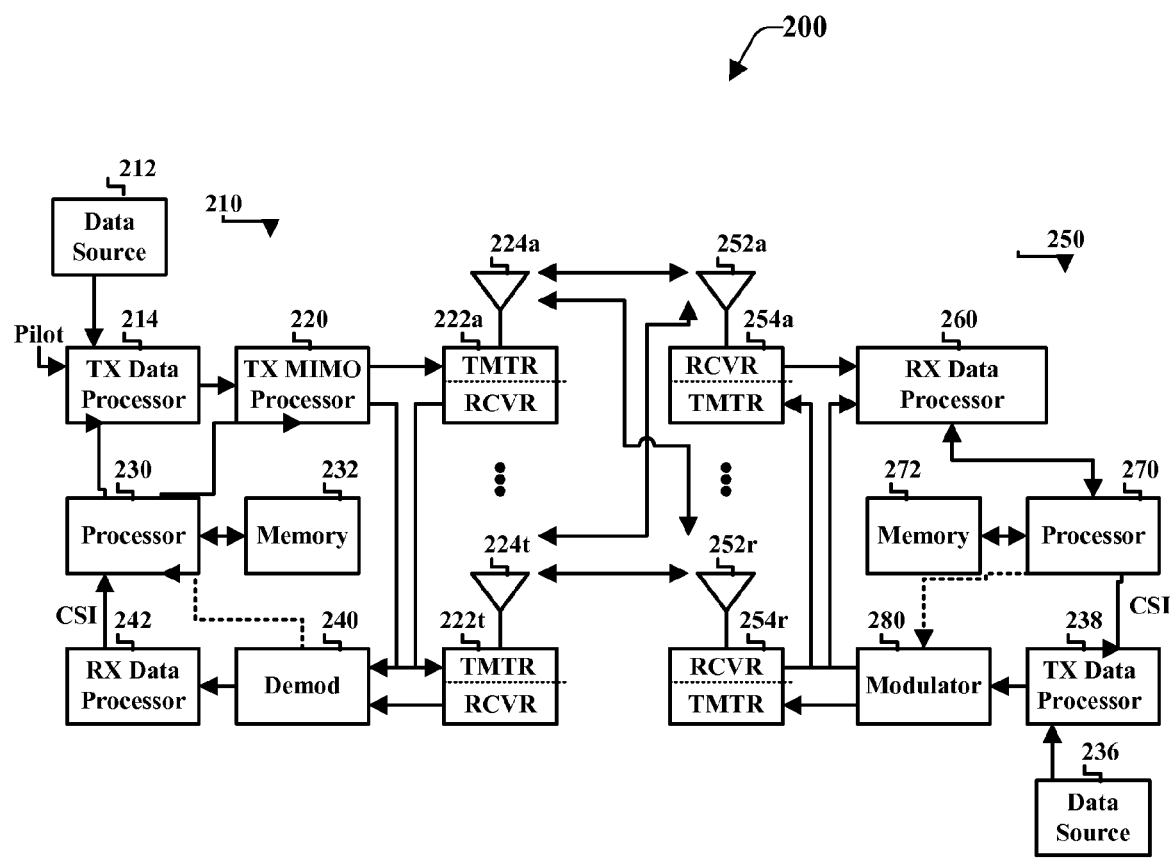
FIG. 2 illustrates a general block diagram of a communication system.

FIG. 2 is a block diagram of a transmitter system 210 (also known as the access point) and a receiver system 250 (also known as access terminal) in a MIMO system 200. At the transmitter system 210, traffic data for a number of data streams is provided from a data source 212 to a transmitter (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beam-forming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beam-forming weights then processes the extracted message.

Figure 3:
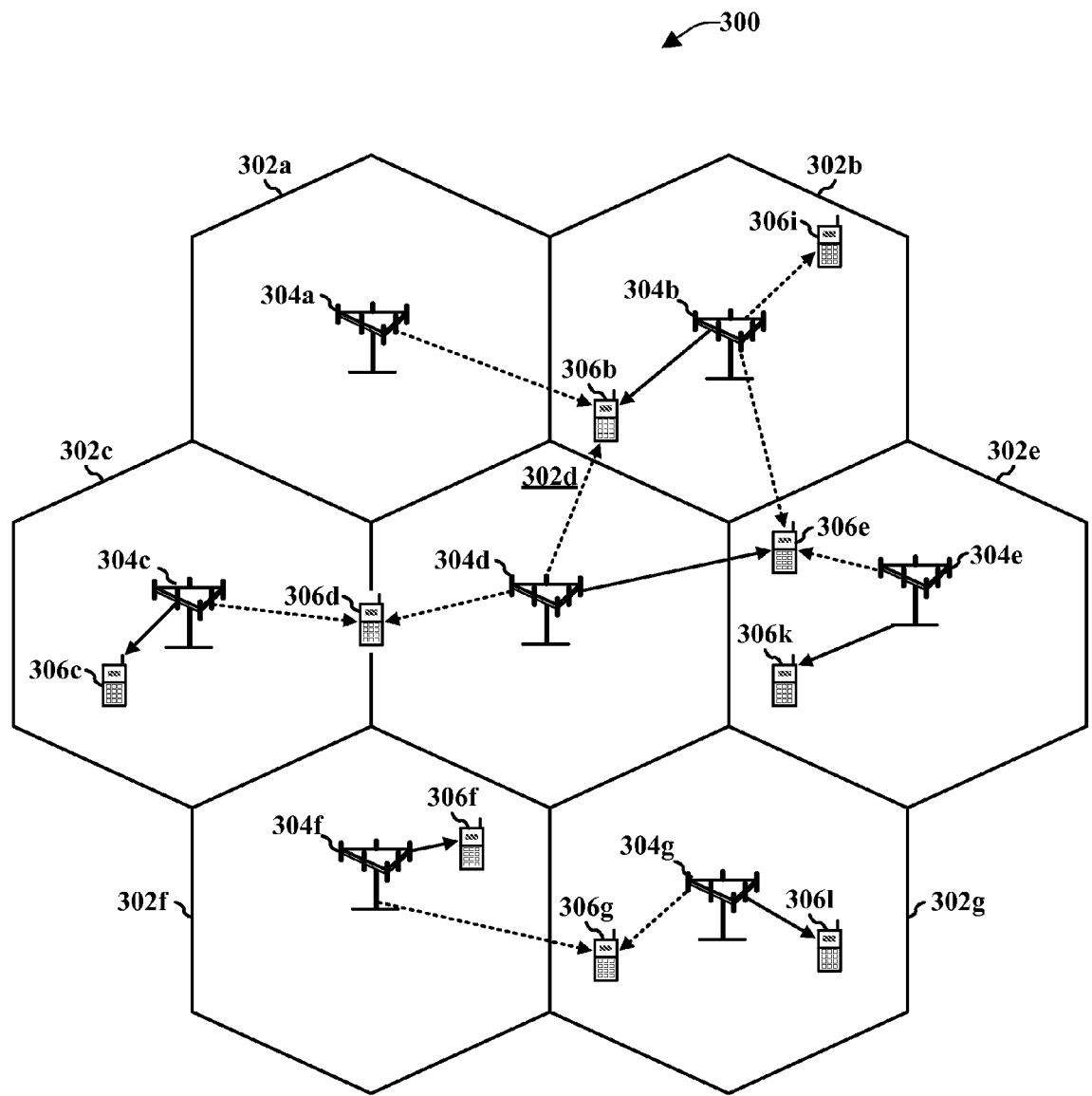
FIG. 3 illustrates an exemplary wireless communication system.

FIG. 3 illustrates an exemplary wireless communication system 300 configured to support a number of users, in which various disclosed embodiments and aspects may be implemented. As shown in FIG. 3, by way of example, system 300 provides communication for multiple cells 302, such as, for example, macro cells 302a-302g, with each cell being serviced by a corresponding access point (AP) 304 (such as APs 304a-304g). Each cell may be further divided into one or more sectors (e.g. to serve one or more frequencies). Various access terminals (ATs) 306, including ATs 306a-306k, also known interchangeably as user equipment (UE) or mobile stations, are dispersed throughout the system. Each AT 306 may communicate with one or more APs 304 on a forward link (FL) and/or a reverse link (RL) at a given moment, depending upon whether the AT is active and whether it is in soft handoff, for example. The wireless communication system 300 may provide service over a large geographic region, for example, macro cells 302a-302g may cover a few blocks in a neighborhood.

The wireless communication system 300 can include a radio link control (RLC) protocol layer (RLC layer) that supports RLC connection establishment and release, with data transfer services to the upper layers in the acknowledged (AM), unacknowledged (UM), and transparent modes (TM). Typically, when a transmitter (e.g., AP 304) sends a set of packets to a receiver (e.g., AT 306, RLC peer), the transmitter does not know if the receiver has actually received the packets in the set, because the packets are transmitted via a hybrid automatic repeat request (HARQ) layer (not shown). Typically, the HARQ layer does not provide a completely reliable delivery, for example, the packets in the set can be delivered out of order or not at all. In order to determine if the receiver has received the packets in the set, the transmitter will poll the receiver for a status report. For instance, the poll can be implemented via a bit, a flag, and so forth included in one or more packets in the set. However, it can be appreciated that if the packet containing the flag is received prior to the other packets in the set, then the receiver may transmit a status report to the transmitter prior to acquiring each of the packets. Based on the status report the transmitter may resend the missing packets, which can be an inefficient use of resources (discussed in greater detail below).

Figure 4:
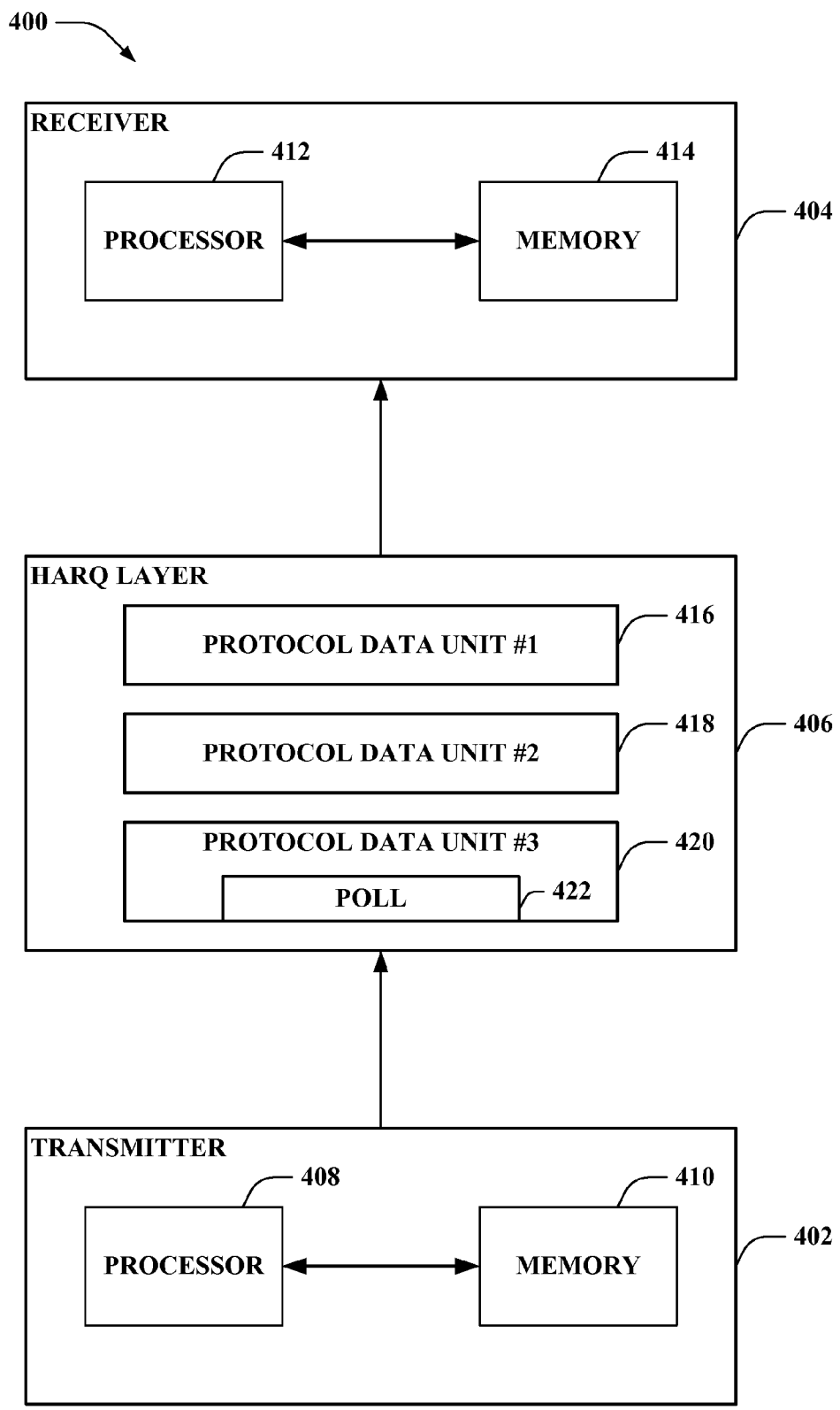
FIG. 4 is an example block diagram illustrating a system for processing polling requests from a radio link control peer in accordance with an aspect of the subject specification

In FIG. 4, a block diagram of an example system for processing polling requests from an RLC peer is provided in accordance with an aspect of the subject specification. As illustrated, such a system 400 may include an RLC transmitter 402, which communicates with an RLC receiver 404 via a hybrid automatic repeat request (HARQ) layer 406. The RLC transmitter 402 can include a processor 408 and memory 410, and the RLC receiver 404 may further include a processor 412 and a memory 414, as shown. For the sequence illustrated in FIG. 4, three protocol data units (PDUs), PDU1 416, PDU2 418, and PDU3 420 are shown in the HARQ layer 406 en route from the RLC transmitter 402 to the RLC receiver 404. As illustrated, each of the PDUs 416, 418, and 420 have been sent in sequential order, and PDU3 420 includes a poll 422.

Typically, using a polling protocol as illustrated, polls (e.g., poll 422) are sent inband with an RLC PDU (e.g., PDU3 420) over the HARQ layer 406. For example, in an LTE network, the RLC receiver 404 is polled by setting a polling field (P field) of an RLC PDU to a value of one (1). Typically, the RLC receiver 404 generates a status report in response to the poll 422; however, the PDUs 416, 418, and 420 can often be delivered out of order. As a result, when the receiver receives the poll 422, there can still be one or more PDUs in transit in the HARQ layer 406. Moreover, if the receiver 404 generates the status report immediately, those in-transit PDUs will be treated as missing, which can cause unnecessary retransmissions.

Figure 5:
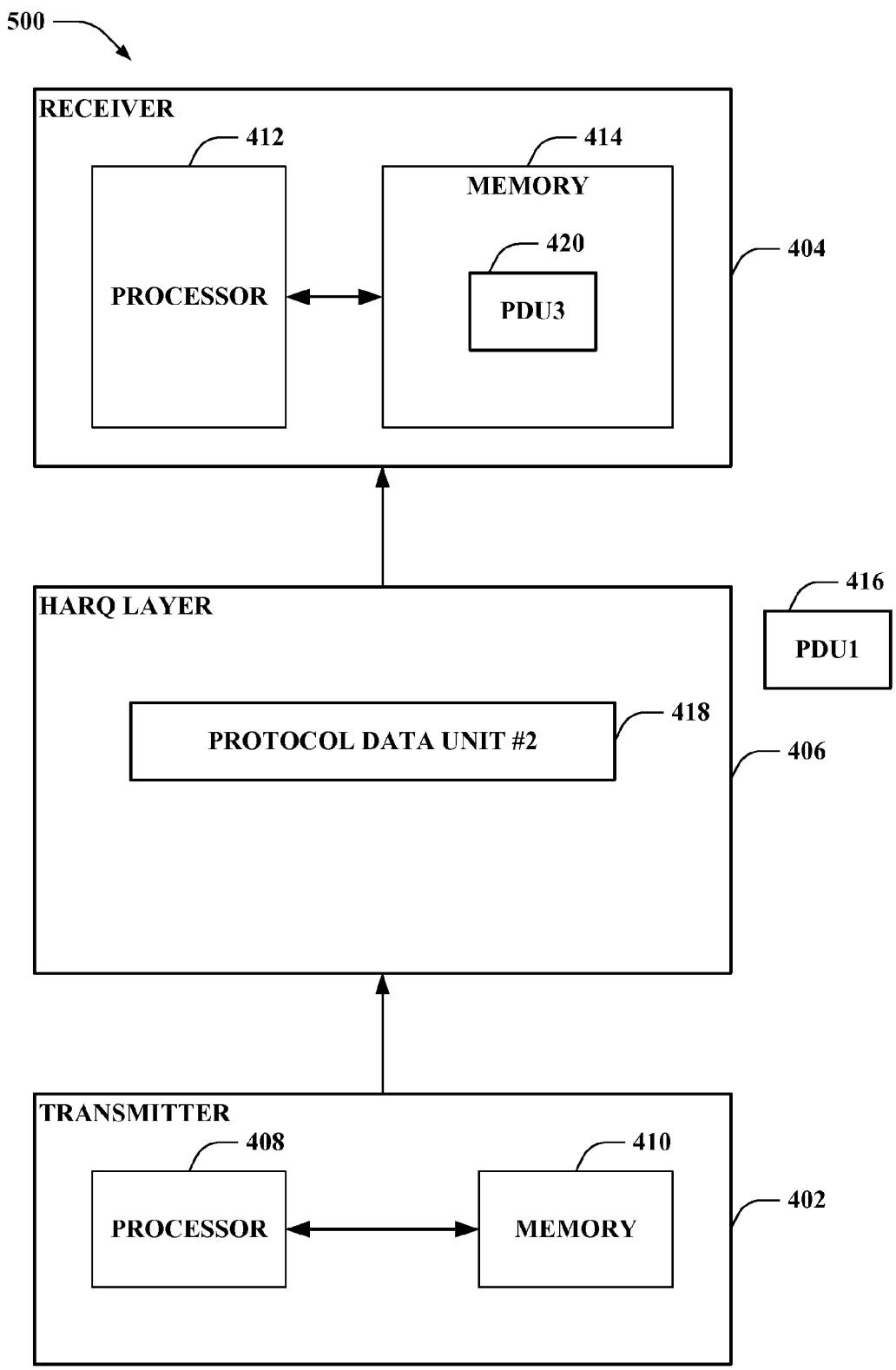
FIG. 5 illustrates an example block diagram of a system for processing polling requests from a radio link control peer in which the protocol data units are received out of order in accordance with an aspect of the subject specification.

Turning briefly to FIG. 5, an example block diagram of a system for processing polling requests from an RLC peer in which the PDUs are received out of order is shown in accordance with an aspect of the present innovation. Namely, the receiver 404 is shown to have adequately (e.g., successfully) received PDU3 420, whereas PDU1 416 has not been adequately (e.g., not successfully) received, and PDU2 418 remains in-transit. Accordingly, if a status report is generated immediately, the status report will indicate that both PDU1 416 and PDU2 418 are missing, despite PDU2 418 being in transit.

Figure 6:
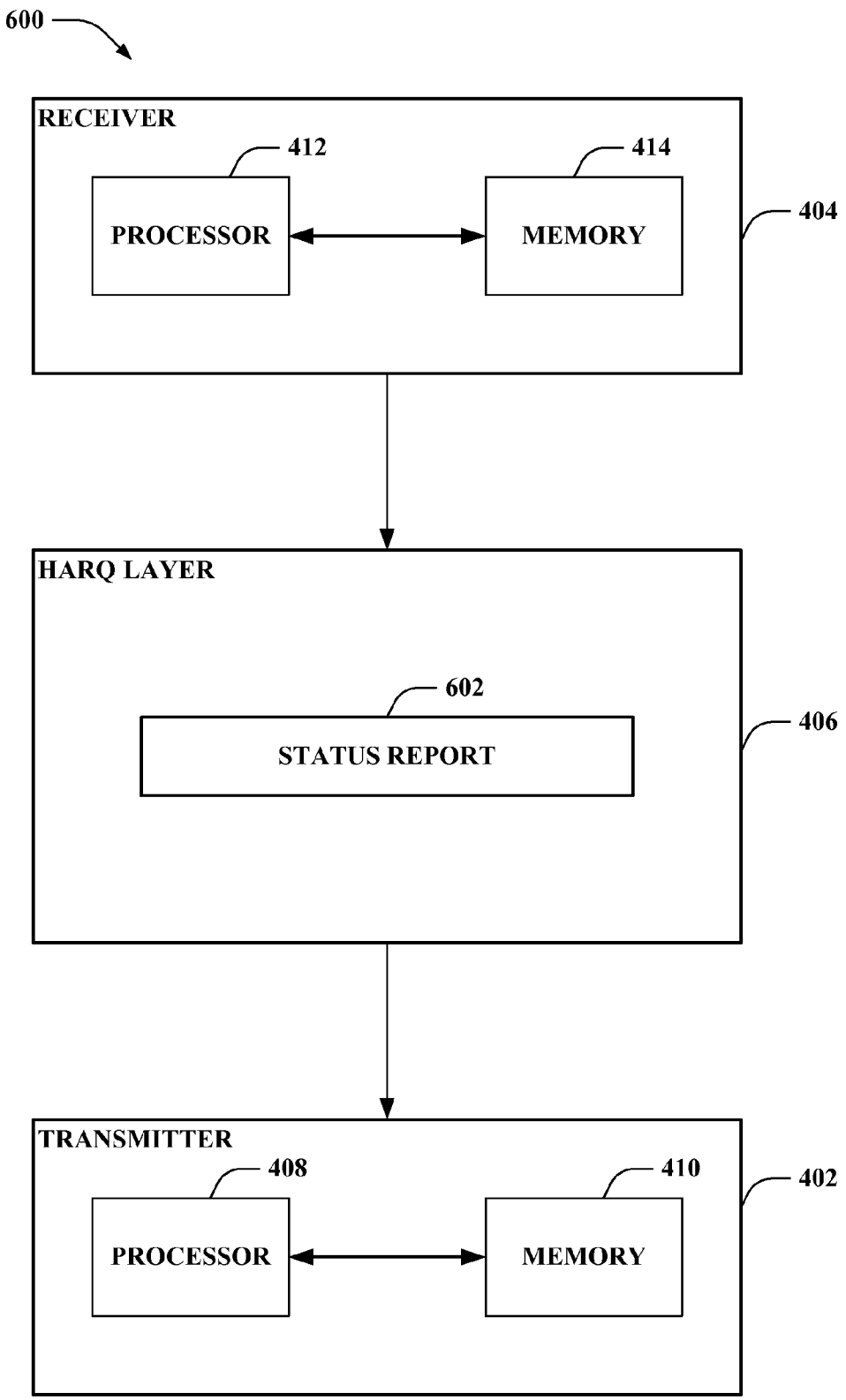
FIG. 6 illustrates an example block diagram of a system for processing polling requests from a radio link control peer in which a generated status report is transmitted from a receiver to a transmitter in accordance with an aspect of the subject specification.

In FIG. 6, an example block diagram of a system for processing polling requests from an RLC peer in which a generated status report 602 is transmitted from a RLC receiver 404 to a RLC transmitter 402 is shown. As discussed previously, the status report 602 is transmitted from the RLC receiver 404 to the RLC transmitter 402 via the HARQ layer 406. If the status report 602 is generated before transmission of the PDUs (e.g., PDU1, PDU2, and PDU3) is complete, then the RLC transmitter may unnecessarily retransmit one or more PDUs. As discussed in greater detail below, one aspect of the current innovation involves delaying generation of the status report 602 until the transmission of PDUs from the RLC transmitter 402 to the RLC receiver 404 is complete.

In an embodiment of the current innovation, the RLC receiver 404 generates and sends the status report 602 only after it receives the poll, and when a maximum status transmit state variable, or VR(MS), is equal to or exceeds a sequence number of the PDU that contains the poll 422 (e.g., PDU3). The VR(MS) stores the highest sequence number of the PDUs that can be carried in the ACK/NACK fields of the status report 602. It is to be appreciated that the foregoing represent but a few examples, and those skilled in the art will be able to readily identify equivalent examples. For instance, the embodiment is shown using three PDUs, but the innovation is not so limited, and can include virtually any number and/or type of data packets.

Figure 7:
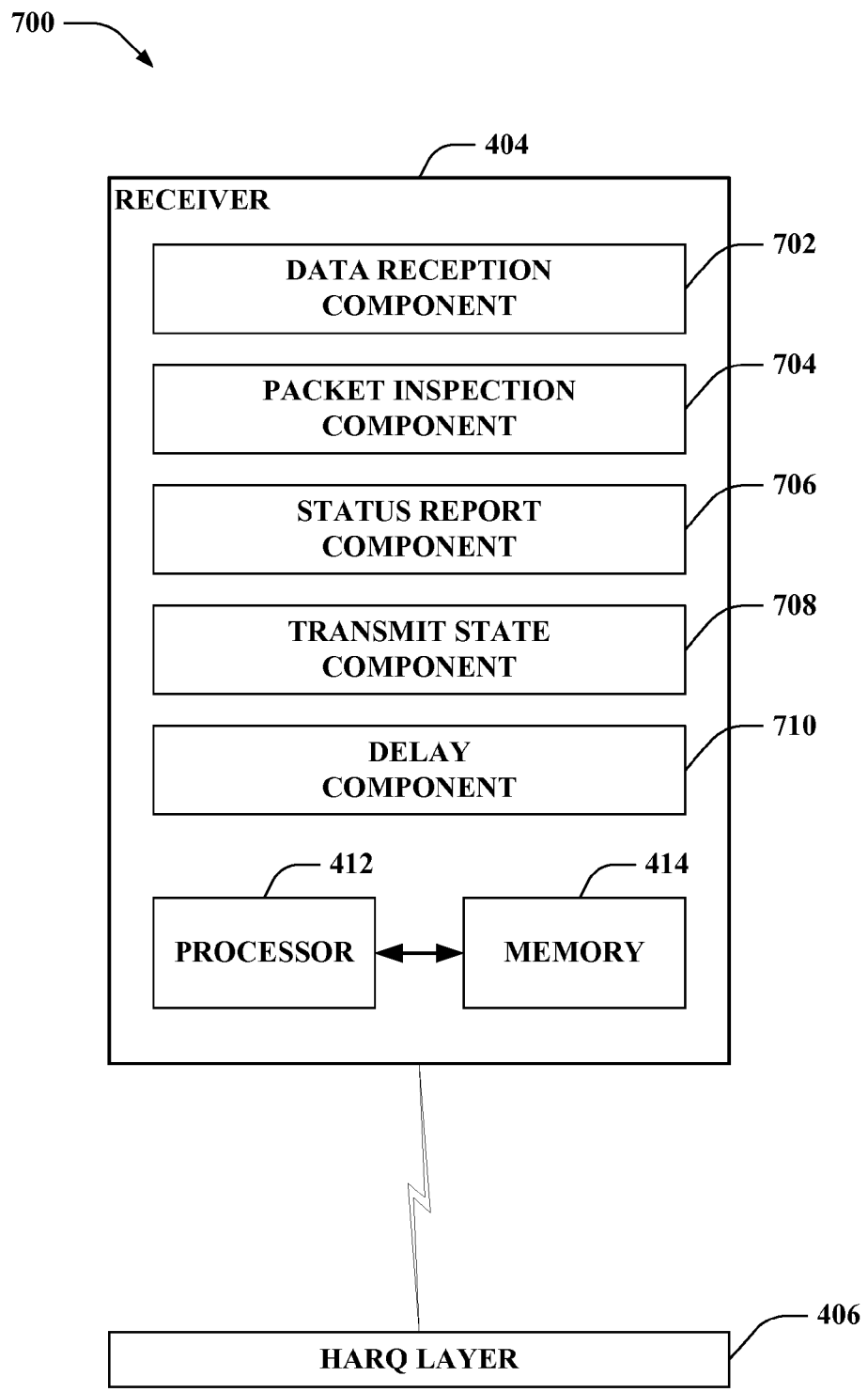
FIG. 7 is an example system for processing polling requests from a radio link control peer shown in accordance with an aspect of the subject specification.

Turning now to FIG. 7, an example system for processing polling requests from a radio link control peer in accordance with an aspect of the subject innovation. The system 700 includes a radio link control (RLC) receiver 404, and a hybrid automatic repeat request (HARQ) layer 406. A RLC transmitter (not shown) can send a set of protocol data units (PDUs) to the RLC receiver 404 (hereinafter 'receiver') via the HARQ layer 406, as discussed previously. The receiver 404 includes a data reception component 702 that can obtain, acquire, or otherwise receive one or more PDUs from the HARQ layer 406. As mentioned supra, the HARQ layer 406 may deliver the PDUs to the receiver 404 in an order different from the order in which they which were sent. For example, the HARQ layer 406 can receive a set of three PDUs (e.g., PDU1, PDU2, and PDU3) in sequential order. However, the HARQ layer 406 may deliver the set of three PDUs in an order other than sequential order, for example, PDU3, PDU1, and then PDU2.

The receiver 404 includes a packet inspection component 704 that can analyze the PDUs received by the data reception component 702. For instance, the packet inspection component 704 can determine a sequence number (SN) of each received PDU. In addition, the packet inspection component 704 can determine if a poll from the transmitter is included in one or more of the PDUs. As discussed previously, typically, when a transmitter sends a set of packets to the receiver 404, the transmitter will not have knowledge of whether the receiver has successfully received packets sent via the HARQ layer 406. Therefore, in order to determine if the receiver 404 has received the packets in the set, the transmitter will poll the receiver 404 for a status report. The poll can be implemented, by way of example, as a bit, a flag, and so forth included in one or more packets sent to the receiver 404. As a further example, in the LTE release 10 standard (Rel-10), polling of the receiver 404 is accomplished by setting a polling field (P field) of a PDU to a have a value of one (1). The inspected PDUs can be maintained, held, or otherwise stored in memory 414.

The receiver 404 includes a status report component 706 that can generate a status report in response to the poll, wherein the status report identifies the PDUs that have been successfully received by the receiver 404. However, as discussed previously, if the PDU containing the poll is received prior to the other packets in the set, the status report can mistakenly identify one or more PDUs as missing that are in transit at the time of the status report generation. Based on the foregoing scenario, the transmitter may unnecessarily resend packets based on the status report.

In order to militate against premature status reports, the receiver 404 further includes a transmit state component 708 that maintains a maximum status transmit state variable component, also referred to as the VR(MS). The transmit state component can set the value(s) of the VR(MS) to the highest sequence number of the PDUs that can be carried in the ACK/NACK fields of a status report. In other words, all PDUs with a sequence number lower than VM(RS) and/or lower than or equal to the VR(MS) are missing and not in-transit in the HARQ layer 406. For example, if a set of three PDUs (e.g., PDU1, PDU2, and PDU3) have been sent to the receiver, and the VR(MS) has a value of 3, then PDU1 and PDU2 are missing and not in-transit.

In addition, the transmit state component 708 can determine gaps in the sequence numbers of the PDUs obtained by the receiver 404. For example, if PDU1 and PDU3 have been successfully received by the receiver 404, then a gap (e.g., PDU2) will be detected. The existence of one or more gaps can indicate that the PDUs associated with those SN may still be in transit. Therefore, the transmit state component 706 can signal a delay component 710 to initiate a wait cycle (e.g., wait period, delay, etc.). The delay component 710 can determine the wait cycle based on an expected time for transmission of a PDU from the HARQ layer 406 or transmitter to the receiver 404. For example, if the expected transmission time of a PDU from the HARQ layer 406 to the receiver 404 is 50 ns, then the delay component 710 can initiate a wait cycle of 50 ns. When the wait cycle is complete, the delay component 710 can notify the transmit state component 708.

When the delay component 710 has completed the wait cycle, it is assumed that any PDUs that have not arrived are not in transit (e.g., are lost). Therefore, the status report component 706 can be instructed to generate the status report based on the current value of VR(MS) maintained in the transmit state component 708. Additionally, or alternatively, the delay component 710 can implement additional wait cycles. Moreover, the delay component can wait until the value of VR(MS) is greater than or equal to the sequence number of the packet containing the poll. It can be appreciated, that this technique can prevent or reduce the likelihood of the receiver sending the transmitter a status report that was generated prior to the reception of PDUs that are still in transit.

Figure 8:
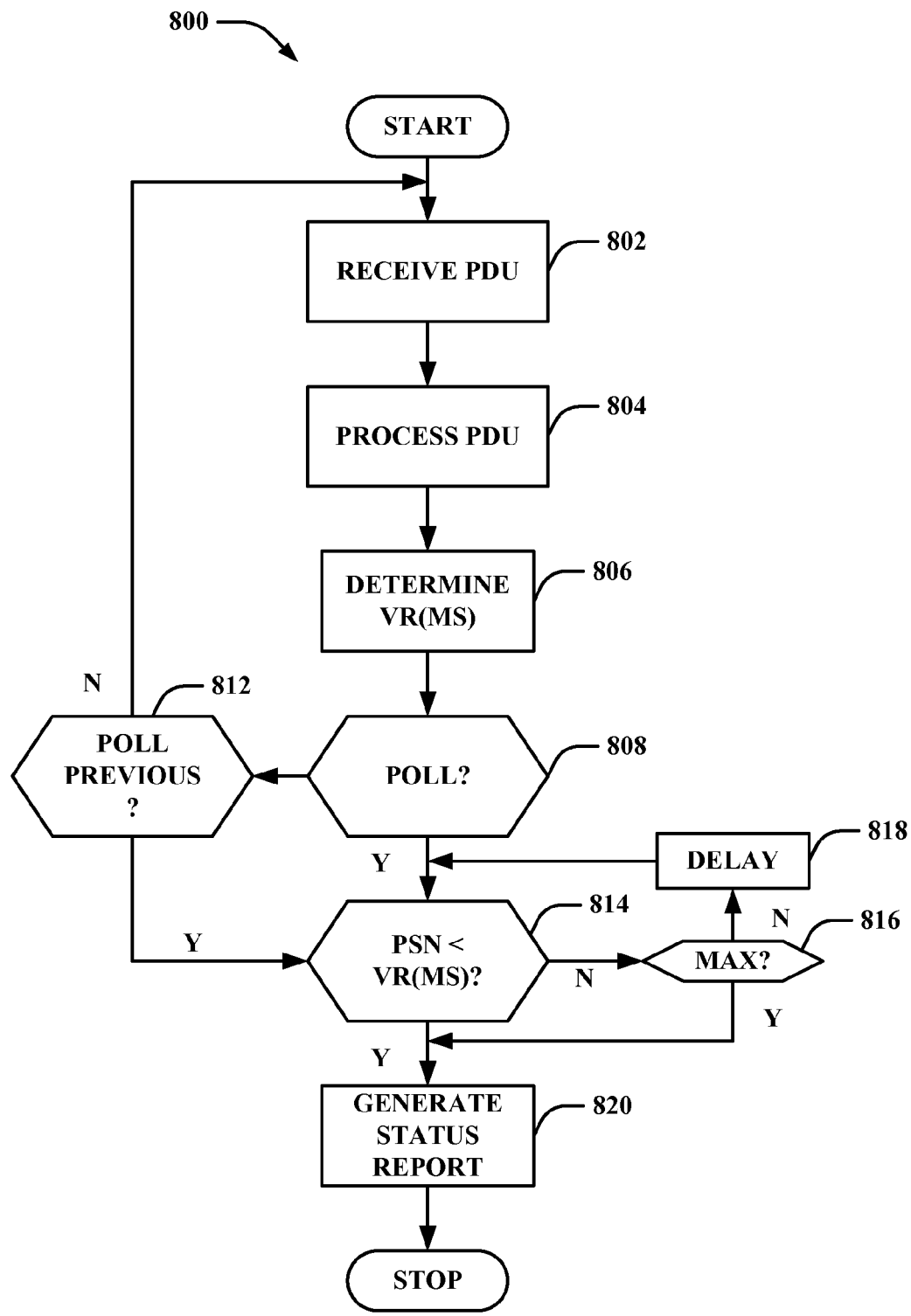
FIG. 8 is an example methodology of processing polling requests from radio link control peers in accordance with an aspect of the subject specification.

In view of the example systems described supra, methodologies that may be implemented in accordance with the disclosed subject matter will be better appreciated with reference to the flow chart of FIG. 8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Referring to FIG. 8, an example methodology of processing polling requests from radio link control peers is illustrated in accordance with an aspect of the subject innovation. At 802, a protocol data unit (PDU) can be obtained, acquired, or otherwise received. As discussed previously, a radio link control (RLC) transmitter can send a set of protocol data units (PDUs) to a RLC receiver via a hybrid automatic repeat request (HARQ) layer. At 804, the received PDU can be processed, including for example, determining a sequence number associated with the PDU, determining if a polling request is included in the PDU, and so forth. The sequence number is a unique identifier that identifies the PDU, particularly among a set of PDUs, and a polling request is a request for a status report from the RLC transmitter regarding the transmission status of one or more transmitted PDUs. As discussed supra, the RLC transmitter typically will not have knowledge of whether the PDUs are successfully/unsuccessfully received by the RLC receiver, and polls the receiver to discover a status of transmitted packets.

At 806, a maximum status transmit state variable component, also referred to as the VR(MS), can be determined based at least in part on the received PDU. The VR(MS) stores the highest sequence number (SN) of the PDUs that can be carried in the ACK/NACK fields of a status report. By way of example, if a set of three PDUs have been sent to a receiver, and PDU1 has been lost, PDU2 is still in transit in the HARQ layer, and PDU3 has been successfully obtained by the receiver, then VR(MS) will be based on the sequence number of PDU3.

At 808, a determination is made to whether the PDU contains a polling request. For instance, the polling request can be a bit, a flag, and so forth included in one or more packets sent to the receiver. As a further example, in the LTE release 10 standard (Rel-10), polling of the receiver is accomplished by setting a polling field (P field) of a PDU to a have a value of one (1). At 812, if a polling request is not included in the PDU, then a determination is made as to whether a polling request was included in a previously received PDU. If a polling request was not in a previously received, then the method returns to 802. If a polling request was included in a previously received PDU, then the method advances to 814 (discussed in greater detail below).

At 814, if a polling request is included in the PDU (or a previous PDU), then a determination is made as to whether the SN of the PDU containing the polling request (e.g., PSN) is less than VR(MS). If the PSN is not less than VR(MS), at 816 a determination is made as to whether a predetermined maximum number of delays have been implemented and/or if a predetermined maximum amount of delay time (e.g., max) has elapsed. If the max has not been satisfied, then at 818 a delay (e.g., wait state, wait cycle, etc.) is implemented prior to returning to 814; however, if the predetermined maximum has been satisfied then the method proceeds to 820 (discussed below). For example, the delay can be based at least in part on the expected time of delivery from the HARQ layer to the receiver in order to allow for delivery of additional PDUs. At 814, if the PSN is less than the VR(MS) then a status report is generated at 820. The status report will indicate to the transmitter the PDUs that have been successfully received and/or those PDUs that were not successfully received. Based on the status report, the transmitter can resend that were not successfully received.

Figure 9:
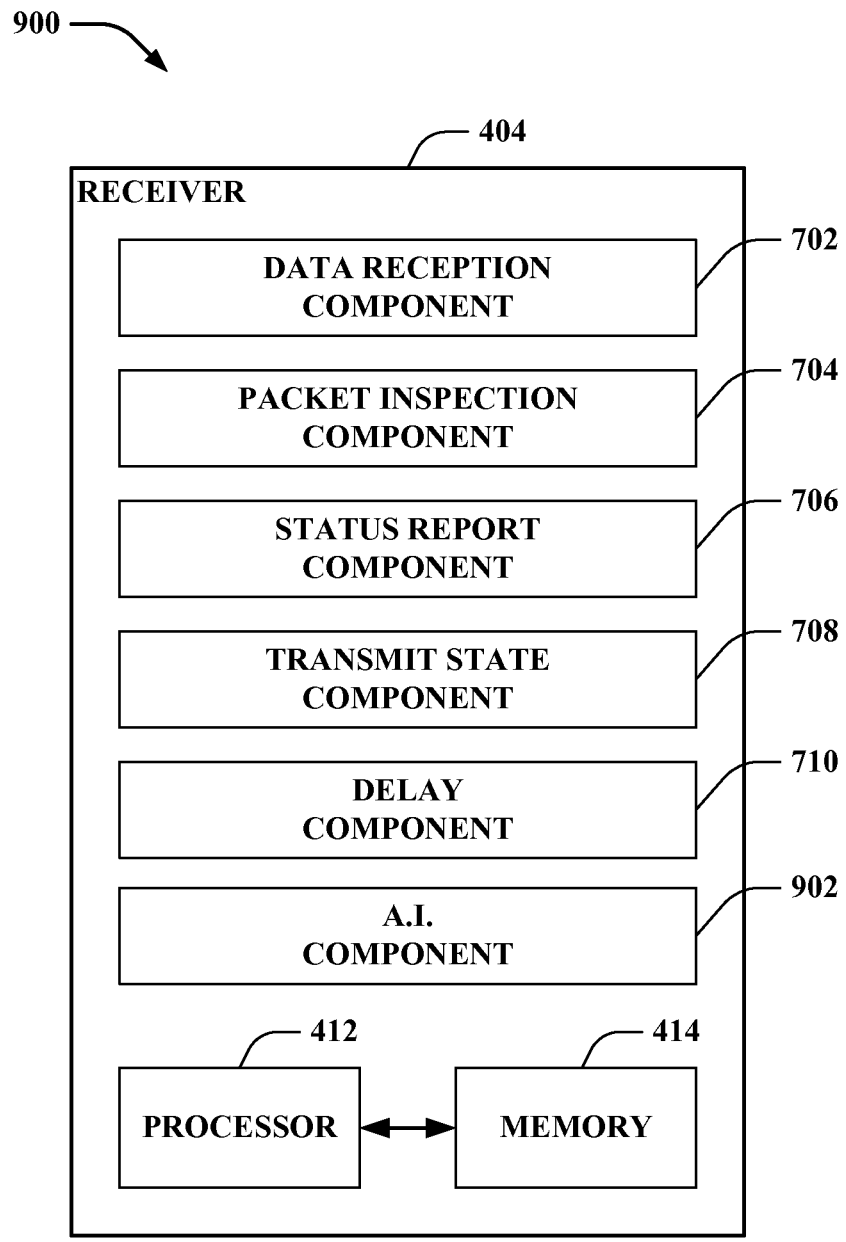
FIG. 9 illustrates a system that employs an artificial intelligence component which facilitates automating one or more features in accordance with the subject specification.

FIG. 9 illustrates a system 900 that employs an artificial intelligence (AI) component 902 which facilitates automating one or more features in accordance with the subject innovation. The subject innovation (e.g., in connection with inferring) can employ various AI-based schemes for carrying out various aspects thereof. For example, a process for determining a period for delay before sending a status report can be facilitated via an automatic classifier system and process.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Furthermore, inference can be based upon logical models or rules, whereby relationships between components or data are determined by an analysis of the data and drawing conclusions there from. For instance, by observing that one user interacts with a subset of other users over a network, it may be determined or inferred that this subset of users belongs to a desired social network of interest for the one user as opposed to a plurality of other users who are never or rarely interacted with.

Directed and undirected model classification approaches including, for example, naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). Thus, the classifier(s) can be used to automatically learn and perform a number of functions, including but not limited to determining according to a predetermined criteria when to update or refine the previously inferred schema, tighten the criteria on the inferring algorithm based upon the kind of data being processed (e.g., financial versus non-financial, personal versus non-personal . . . ), and at what time of day to implement tighter criteria controls (e.g., in the evening when system performance would be less impacted).

Figure 10:
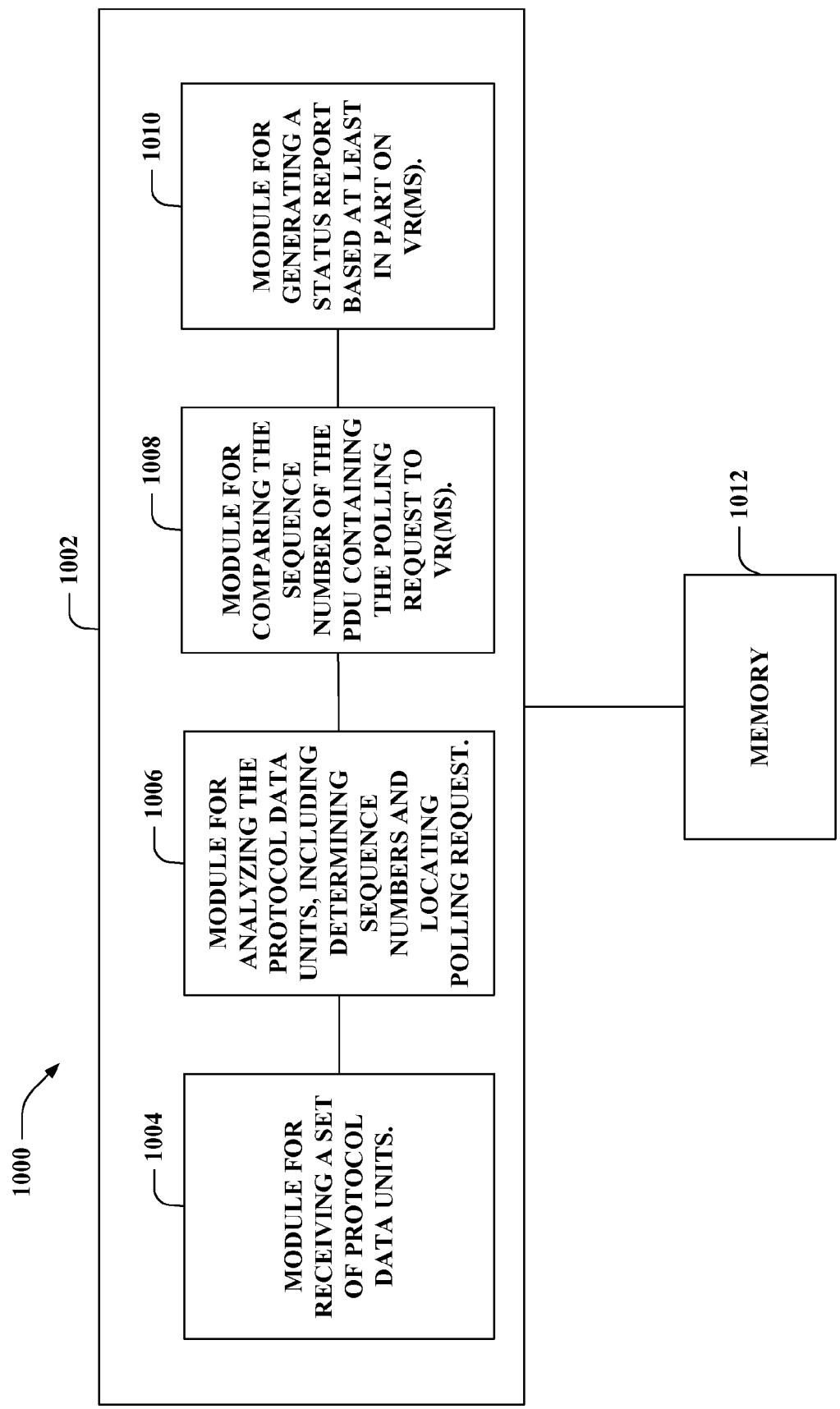
FIG. 10 is an example block diagram of a system that facilitates processing polling requests from radio link control peers in a wireless communication system in accordance with an aspect of the subject innovation.

With reference to FIG. 10, illustrated is an example block diagram of a system 1000 that facilitates processing polling requests from radio link control peers in a wireless communication system. For example, system 1000 can reside at least partially within a mobile device, etc. It is to be appreciated that system 1000 is represented as including functional blocks, which can be functional blocks that represent functions implemented by a processor, software, or combination thereof (e.g., firmware). System 1000 includes a logical grouping 1002 of modules that can act in conjunction. For instance, logical grouping 1002 can include a module for receiving one or more protocol data units (PDUs) via the wireless communication network. Further, logical grouping 1002 can comprise a module for analyzing the protocol data units, including determining sequence numbers and locating polling request 1006. Moreover, the logical grouping 1002 can include a module for comparing the sequence number of the PDU containing the polling request to VR(MS). Additionally, system 1000 can include a module for generating a status report in response to the polling request based at least in part on the value of VR(MS) 1010. Furthermore, system 1000 can include a memory 1012 that retains instructions for executing functions associated with modules 1004, 1006, 1008 and 1010. While shown as being external to memory 1012, it is to be understood that one or more of modules 1004, 1006, 1008, and 1010 can exist within memory 1012.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for processing polling requests from radio link control peers, comprising:
    receiving a data packet of a set of data packets;
    determining at least one characteristic of the data packet, wherein the at least one characteristic comprises a value of a poll field;
    determining whether there is a request to generate a status report based on the poll field;
    comparing the at least one characteristic with a reference value;
    selecting from one of a plurality of predetermined amounts of time based on the comparison;
    determining a maximum number of wait states; and
    generating the status report based on the determining whether there is a request to generate a status report and one of:
        the maximum number of wait states have occurred after reception of the request for the status report, or
        the selected predetermined amount of time has elapsed after reception of the request for the status report, the amount of the selected predetermined amount of time being determined prior to the comparison.

2. The method of claim 1, wherein the set of data packets include protocol data units.

3. The method of claim 1, wherein the at least one characteristic further comprises a sequence number associated with the data packet and generating the status report occurs when there is a request to generate a status report and the sequence number associated with the data packet containing a request to generate a status report is less than or equal to the reference value.

4. The method of claim 3, wherein the reference value is a value of a maximum status transmit state variable that stores the highest sequence number of the set of data packets that can be carried in an acknowledgement/negative acknowledgement field of the status report.

5. The method of claim 4, further comprising generating a status report if the sequence number associated with the data packet containing a request to generate a status report is less than or equal to the maximum status transmit state variable, wherein the data packet containing the request to generate the status report contains a value of one in the poll field.

6. The method of claim 4, further comprising delaying generation of the status report until the sequence number associated with the data packet containing a request to generate a status report is at least one of less than or equal to the maximum status transmit state variable, wherein the data packet containing the request to generate the status report contains a value of one in the poll field.

7. A wireless communication apparatus comprising:
    a memory configured to store at least one protocol data unit; and
    at least one processor configured to process polling requests from radio link control peers, the at least one processor being configured to:
        receive the protocol data unit;
        determine a sequence number associated with the protocol data unit;
        detect an included polling request in the protocol data unit;
        compare the sequence number of the protocol data unit having the included polling request to a value of a maximum status transmit state variable;
        selecting from one of a plurality of predetermined amounts of time based on the comparison;
        determining a maximum number of wait states;

generate a status report based on the polling request at a first predetermined amount of time, or when the maximum number of wait states has occurred, if the sequence number of the protocol data unit having the included polling request is equal to or less than the value of the maximum status transmit state variable; and generate the status report based on the polling request at a second predetermined amount of time when the second predetermined amount of time has elapsed after reception of a request for the status report, the amount of the first and second predetermined amount of time being determined prior to the comparison.

8. The wireless communication apparatus of claim 7, wherein the sequence number of the protocol data unit having the included polling request is not at least one of equal to or less than the value of the maximum status transmit state variable.

9. The wireless communication apparatus of claim 8, wherein the second predetermined amount of time is based at least in part on an estimated transmission time.

10. A computer program product, comprising:
a non-transitory computer-readable medium comprising:
   a first set of codes for causing a computer to obtain one or more protocol data units;
   a second set of codes for causing the computer to locate a sequence number for each of the protocol data units;
   a third set of codes for causing the computer to detect a value of a polling bit in the protocol data units;
   a fourth set of codes for causing the computer to compare the sequence number of the protocol data unit to a value of a maximum status transmit state variable, wherein the value of the polling bit in the protocol data unit is one;
   a fifth set of codes for causing the computer to generate a status report based on the value of the polling bit at a first predetermined amount of time or after a maximum number of wait states has occurred, if the sequence number of the protocol data unit is equal to or less than the value of the maximum status transmit state variable, wherein the value of the polling bit in the protocol data unit is one; and
   a sixth set of codes for causing the computer to generate the status report at a second predetermined amount of time when the second predetermined amount of time has elapsed after reception of a request for the status report, the amount of the first and second predetermined amount of time being determined prior to the comparison.

11. The computer program product of claim 10, wherein the sequence number of the protocol data unit is not at least one of equal to or less than the value of the maximum status transmit state variable, and the value of the polling bit in the protocol data unit is one.

12. The computer program product of claim 10, wherein the second predetermined amount of time is based at least in part on an estimated time of transmission for the protocol data units.

13. An apparatus, comprising:
means for acquiring one or more data packets;
means for processing the data packets, wherein processing includes at least one of determining a sequence number for each data packet, or identifying if a poll is included in each packet;
means for determining a value for a maximum status transmit state variable, wherein the maximum status transmit state variable stores the highest sequence number of the set of received data packets that can be carried in the acknowledgement/negative acknowledgement field of a status report;
means for evaluating the sequence number of the data packet that includes the poll in relation to the value of the maximum status transmit state variable;
means for selecting from one of a plurality of predetermined amounts of time based on the comparison;
means for determining a maximum number of wait states; and
means for generating the status report based on the poll when the selected predetermined amount of time has elapsed after reception of a request for the status report, or a maximum number of wait states has occurred after reception of the request for the status report, the amount of the selected predetermined amount of time being determined prior to the evaluation.

14. The apparatus of claim 13, further comprising means for generating a status report where the sequence number of the data packet that includes the poll is less than the value of the maximum status transmit state variable.

15. The apparatus of claim 14, further comprising means for generating a status report where the sequence number of the data packet that includes the poll is equal to the value of the maximum status transmit state variable.

16. The apparatus of claim 13, further comprising means for delaying generation of the status report where the sequence number of the data packet that includes the poll is not less than the value of the maximum status transmit state variable.

17. The apparatus of claim 16, wherein the delay is based at least in part on an estimated transmission time.

18. The apparatus of claim 17, further comprising means for generating the status report when at least one of a maximum number of delays has been implemented, or a maximum delay time has been exceeded.

19. An apparatus, comprising:
means for obtaining one or more packets;
means for determining a sequence number, and the existence of a polling request for each received packet;
means for generating a status report based at least in part on a comparison of the sequence number of the packet to a reference value, wherein a polling request for a status report exists in the packet; and
means for causing the status report component to wait prior to generating the status report until at least one of: a maximum wait time after receipt of the polling request for the status report has expired, the maximum wait time being determined prior to the comparison, or a maximum number of wait states have been implemented after receipt of the polling request for the status report.

20. The apparatus of claim 19, wherein the reference value is a value of a maximum status transmit state variable.

21. The apparatus of claim 20, wherein the value of the maximum status transmit state variable is at least one of greater than or equal to the sequence number of the packet, wherein a polling request exists in the packet.

22. The apparatus of claim 19, wherein the packets include protocol data units.

23. The apparatus of claim 19, further comprising means for automating one or more features of the apparatus.

24. A wireless communications apparatus, comprising:
a memory that stores at least one received data packet; and
a processor configured to determine at least one characteristic of the data packets, determine whether there is a request for a status report based on the at least one characteristic, compare the at least one characteristic with a reference value, select from one of a plurality of predetermined amounts of time based on the comparison, and generate the status report based on whether there is a request for a status report when either: the selected predetermined amount of time has elapsed after reception of the request for the status report, or a maximum number of wait states has occurred after reception of the request for the status report, the amount of the selected predetermined amount of time being determined prior to the comparison.

25. The wireless communications apparatus of claim 24, wherein the data packets are protocol data units.

26. The wireless communications apparatus of claim 24, wherein the data packets are received via a hybrid automatic repeat request layer.

27. The wireless communications apparatus of claim 24, wherein the at least one characteristic includes at least one of a sequence number associated with the data packet, or a value of a poll field in the data packet.

28. The wireless communications apparatus of claim 27, wherein the reference value is a value of a maximum status transmit state variable that stores the highest sequence number of the set of received data packets that can be carried in an acknowledgement/negative acknowledgement field of the status report.

29. The wireless communications apparatus of claim 28, wherein the processor is configured to generate the status report if there is a request for a status report and the sequence number associated with the data packet is at least one of less than or equal to the maximum status transmit state variable, and the data packet contains a value of one in the poll field.

30. The wireless communications apparatus of claim 28, wherein the processor is configured to delay generation of the status report until the sequence number associated with the data packet is at least one of less than or equal to the maximum status transmit state variable, wherein the data packet contains a value of one in the poll field.

* * * * *